No. 883,451. PATENTED MAR. 31, 1908.
O. G. COLLIER.
BAIL AND HASP FASTENER.
APPLICATION FILED APR. 13, 1907.
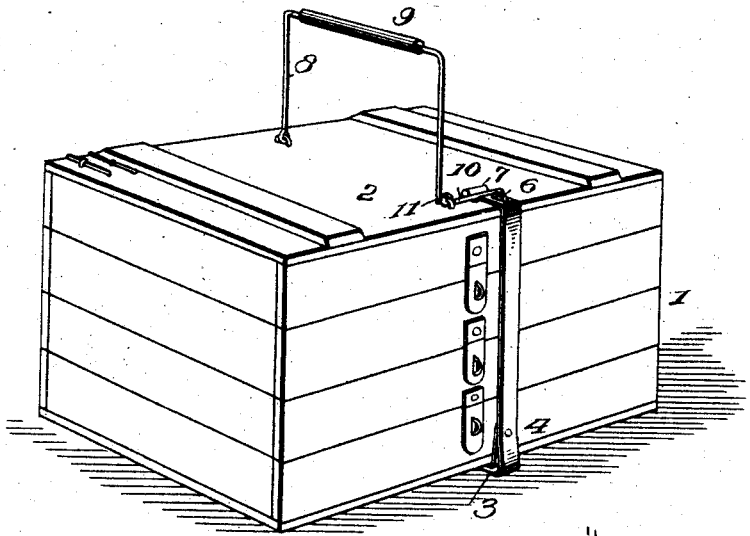
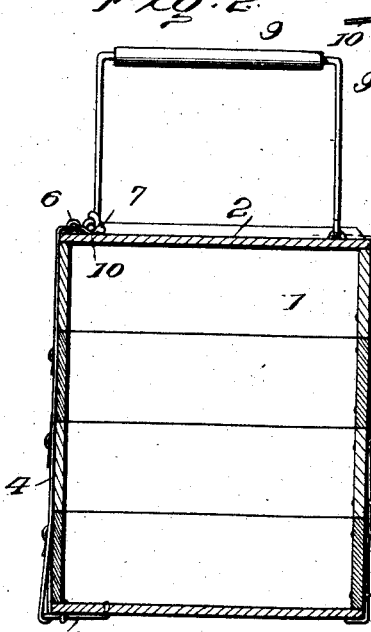
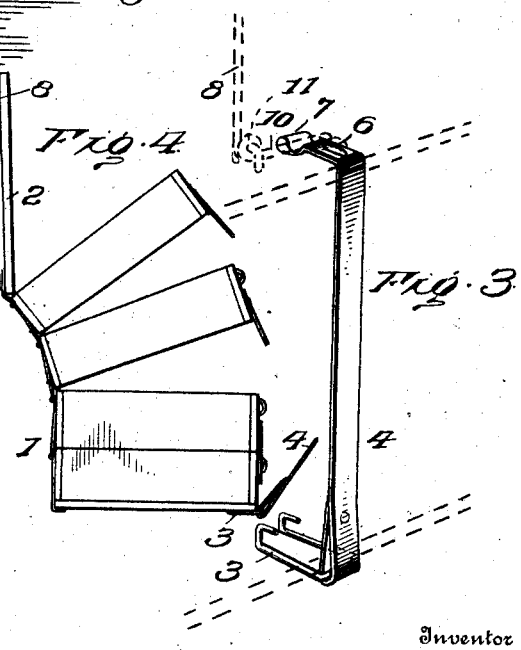
Inventor
O. G. Collier
Witnesses
By R. A. Lacey,
Attorneys

UNITED STATES PATENT OFFICE.

OSCAR G. COLLIER, OF FAIRBURY, NEBRASKA.

BAIL AND HASP FASTENER.

No. 883,451.  Specification of Letters Patent.  Patented March 31, 1908.

Application filed April 13, 1907. Serial No. 368,106.

*To all whom it may concern:*

Be it known that I, OSCAR G. COLLIER, citizen of the United States, residing at Fairbury, in the county of Jefferson and State of Nebraska, have invented certain new and useful Improvements in Bail and Hasp Fasteners, of which the following is a specification.

This invention relates generally to improvements in receptacles and locking means therefor, and more particularly to an improved construction of hasp and bail combined, the hasp being held on its staple, or similar keeper by the action of the bail of the receptacle when such bail is in its normal carrying position.

The invention consists in certain constructions and arrangements of the parts hereinafter described and claimed, reference being had to the following description and accompanying drawing, in which:

Figure 1 is a perspective view of a box or case illustrating the invention; Fig. 2 is a vertical sectional view thereof; Fig. 3 is a detail view of the hasp; and Fig. 4 is a side elevation, the box being partially open.

Corresponding and like parts are referred to in the following description and indicated in all the views of the drawings by the same reference characters.

In the present instance I have illustrated my invention as embodied in a sectional receptacle or egg case, but it is to be understood that it is equally applicable to any receptacle that is designed to be lifted or carried by means of a bail handle and which embodies a lid that is designed to be secured to the body of the receptacle.

Referring to the drawing, the numeral 1 designates the body of the egg case or other receptacle and 2 the lid thereof. 3 designates a loop which is secured to the bottom of the receptacle, and 4 designates a hasp in the form of a strap which has one end inserted through the loop and bent upon itself and riveted or otherwise fastened and which is of a sufficient length to extend up from the bottom of the receptacle to the lid, as clearly illustrated in the drawing. The upper or free end of the hasp 4 is provided with an eye adapted to receive the keeper 6 consisting of a staple or other device and beyond said eye the hasp is formed with an outwardly facing shoulder 7, preferably constructed by curling the edge of the strap which constitutes the hasp.

The bail 8 is provided with the ordinary sleeve or other form of handle 9 and is pivotally mounted in any suitable manner upon the lid so as to swing downwardly and lie on the lid or be swung up from the lid in its carrying position and said bail is formed with a latch 10 which is preferably rigidly secured thereto so as to stand substantially upright when the bail is swung down against the lid and to extend in a substantially horizontal position in front of the shoulder 7 of the hasp, when the bail is in its carrying position.

From the foregoing description in connection with the accompanying drawing, it is obvious that after the hasp has been engaged with the staple or keeper 6, the handle of the bail may be raised to a carrying position so as to bring the latch 10 into locking engagement with the hasp and prevent the disengagement of the latter from its keeper, the weight of the box when it is being carried by the handle insuring that this locking arrangement shall be effective. In the present instance, the bail 8 is constructed of a single length of suitably heavy wire and the latch 10 is formed by extending one end of this wire strip beyond the eye or loop 11 which forms a means for pivotally attaching one end of the bail to the lid.

Having thus described the invention, what is claimed as new is:

1. The combination with the body and lid of a receptacle, of a hasp secured to the body, a keeper secured to the lid and arranged for engagement with said hasp, and a bail pivotally mounted on the lid and provided with an angularly disposed latch adapted to be moved over upon the hasp upon the raising of the bail to a carrying position, whereby to hold the hasp in engagement with the keeper.

2. The combination with the body and lid of a receptacle, of a hasp secured to the body, a keeper secured to the lid and arranged for engagement with the said hasp, the hasp being formed at one end with an outwardly facing shoulder, and a bail pivotally mounted on the lid and provided at one side with an angularly disposed latch adapted to be moved across and against the shoulder upon the raising of the bail to a carrying position.

3. The combination with the body and lid of a receptacle, of a hasp secured to the body and provided with an eye, a keeper secured to the lid and adapted to be received in said eye, the hasp being formed beyond its eye with an outwardly facing shoulder, and a bail pivotally mounted on the lid and provided at one side with an angularly disposed latch rigidly connected therewith and adapted to be moved across and against the shoulder upon the raising of the bail to a carrying position.

In testimony whereof I affix my signature in presence of two witnesses.

OSCAR G. COLLIER. [L. S.]

Witnesses:
 B. W. McLucas,
 J. O. Evans.